US007545385B2

(12) United States Patent
Miller

(10) Patent No.: US 7,545,385 B2
(45) Date of Patent: Jun. 9, 2009

(54) INCREASED COLOR DEPTH, DYNAMIC RANGE AND TEMPORAL RESPONSE ON ELECTRONIC DISPLAYS

(75) Inventor: Ian Miller, Lake Forest, CA (US)

(73) Assignee: Samsung Electronics Co., Ltd., Suwon (KR)

(*) Notice: Subject to any disclaimer, the term of this patent is extended or adjusted under 35 U.S.C. 154(b) by 516 days.

(21) Appl. No.: 11/317,043

(22) Filed: Dec. 22, 2005

(65) Prior Publication Data

US 2007/0146382 A1 Jun. 28, 2007

(51) Int. Cl.

| | |
|---|---|
| ***G09G 5/00*** | (2006.01) |
| ***H04N 5/74*** | (2006.01) |
| ***H04N 5/57*** | (2006.01) |
| ***G09G 3/28*** | (2006.01) |
| ***G09G 3/30*** | (2006.01) |
| ***G09G 5/10*** | (2006.01) |

(52) U.S. Cl. ....................... 345/589; 345/581; 345/690; 345/214; 345/77; 348/578; 348/602

(58) Field of Classification Search ................. 345/589, 345/600, 613, 617, 562, 596, 598, 694, 3.3, 345/581, 618–619, 204–205, 38, 690–691, 345/698, 699, 214, 3.4, 45, 84, 48, 63, 77; 348/245–247, 268–270, 490, 578, 602, 687, 348/728, 766

See application file for complete search history.

(56) References Cited

U.S. PATENT DOCUMENTS

| | | | | |
|---|---|---|---|---|
| 5,659,672 | A * | 8/1997 | Yutaka et al. | 345/582 |
| 5,856,686 | A * | 1/1999 | Watanabe et al. | 257/291 |
| 5,875,268 | A * | 2/1999 | Miyake | 382/276 |
| 6,078,307 | A * | 6/2000 | Daly | 345/600 |
| 6,211,859 | B1 * | 4/2001 | Lin et al. | 345/596 |
| 6,326,981 | B1 * | 12/2001 | Mori et al. | 345/695 |
| 6,624,825 | B1 * | 9/2003 | Fujiyoshi | 345/698 |
| 6,664,973 | B1 * | 12/2003 | Iwamoto et al. | 345/589 |
| 6,911,784 | B2 * | 6/2005 | Sasaki et al. | 315/169.4 |
| 7,003,176 | B1 * | 2/2006 | Suzuki et al. | 382/299 |
| 2002/0101433 | A1 * | 8/2002 | McKnight | 345/589 |
| 2004/0080516 | A1 * | 4/2004 | Kurumisawa et al. | 345/596 |

FOREIGN PATENT DOCUMENTS

JP 09080466 * 3/1997

OTHER PUBLICATIONS

U.S. Appl. No. 11/321,096, filed Dec. 29, 2005, Ian Miller.

* cited by examiner

*Primary Examiner*—Wesner Sajous
(74) *Attorney, Agent, or Firm*—Kenneth L. Sherman, Esq.; Michael Zarrabian, Esq.; Myers Andras Sherman LLP

(57) ABSTRACT

A display method and system maps each source image pixel from a source device into several display pixels on a display screen, where the characteristics of the display pixels are selectively controlled to provide desired visual effects such as multiple luminance levels, increased color depth, increased dynamic luminance range and manipulation of temporal characteristics of the display.

26 Claims, 6 Drawing Sheets

100

11
10
13
14
12

11
13
(a)
(b)
(c)
(d)

13
(a)
Time 13
(b)
Time 13
(c)
Time 13
(d)
Time 13
(a)
(b)
(c)
(d)
Time
1
2
3
4
5
6
7
8
9
10
11
12
Frames

INCREASED COLOR DEPTH, DYNAMIC RANGE AND TEMPORAL RESPONSE ON ELECTRONIC DISPLAYS

FIELD OF THE INVENTION

The present invention relates in general to displaying video image information, and in particular to enhancing display of video image information.

BACKGROUND OF THE INVENTION

Many display systems are being used to display different types of source images such as those generated by office software applications, video games, movies, etc. For these different types of source images, there are different luminance levels for display. For example, office applications (e.g., word processor) and video games are two difference extremes. In office applications, typically a very bright display screen relative to the background is not desired, whereas in entertainment applications such as video games user prefer visual effects of a bright display screen (higher luminance level) relative to the background. Conventionally, for displays such as LCD and Plasma, perception of higher level of luminance is achieved by increasing the power output of the display backlight. However, a bright backlight is expensive and consumes high power. Other schemes involve changing the ambient lighting intensity and color tone based on the image being displayed to enhance perception of the image relative to the ambient lighting. Yet other schemes monitor the ambient light and change display intensity accordingly. However, such techniques are often ineffective and further require additional hardware to achieve any results.

Further, conventional displays are limited to 8 bits of color depth, even when using spatial or temporal dithering to enhance color depth. Displays that can display more than 8 bits of color depth are problematic because the levels above 8 bits are very close together in voltage terms whereby any noise causes a cross-over leading to artifacts. In addition, mainstream digital interfaces (e.g., DVI, HDMI, etc.) cannot conveniently utilize more than 8 bits for color depth for display.

Another shortcoming of conventional displays systems such as LCD and Plasma (relative to CRTs) is that the maximum luminance in such displays cannot be selectively enhanced depending on the source image, whereby image contrast suffers. CRTs use an overdrive technique for enhancing luminance, wherein for example, in case of bright transitions in an image from back to white, the overdrive technique causes transitions from black to superwhite to provide the visual impact of very high contrast due to a very sharp transition. LCD displays do not provide such capability and resort to a very bright backlight for contrast. However, a bright backlight is expensive and consumes high power. Plasma displays drive the display harder for higher contrast ratio, resulting in higher power consumption, cost and shorter display life.

Yet another problem with LCDs is their relatively slow pixel state transition (slow temporal response characteristics) relative to that possible in CRTs. The slowness causes undesirable artifacts such as blurring and ghosting for fast moving objects in images (e.g., sports, games, etc.). The relative slow switching time (response time) of LCD displays coupled with the fact that conventionally each pixel is 'on' at an essentially constant luminance value until the information content of that pixel changes, generates various forms of motion artifact particularly when there is fast moving image content (e.g., movie chase scenes, sports, games, etc). A conventional approach for reducing the motion artifacts relies on breaking the "essentially constant luminance" value of each pixel (over a short time period) into a series of light pulse, by turning all pixels 'off' (i.e., a black screen) during alternate frames so that the luminance from each pixel is constantly turning 'on' and 'off'. However, this causes considerable flickering of the displayed images unless LCD display is operated at a higher frame rate than normal which requires non-standard design at a higher cost.

BRIEF SUMMARY OF THE INVENTION

In one embodiment, the present invention provides a display method and system maps each source image pixel from a source device into several display pixels on a display screen, where the characteristics of the display pixels are selectively controlled to provide desired visual effects such as multiple luminance levels, increased color depth, increased dynamic luminance range, manipulation of temporal characteristics of the display, etc.

According to an embodiment of the present invention, each source image pixel (from a source device) is mapped to several display pixels on a screen, wherein the display pixels are selectively controlled to provide desired visual effects such as additional color depth and dynamic range, improved perceived temporal response characteristics of the display, etc.

In one embodiment, when each image pixel (from source device) is represented on an electronic display by mapping into n display pixels, some or all of the n display pixels representing a single image pixel are switched together to provide multiple desired luminance levels. The multiple luminance levels can be selected manually (by user) or automatically by detection of ambient lighting conditions and/or the type of image being displayed. The number of luminance levels possible is equal to the number n of display pixels associated with each image pixel and is independent of display technology.

In another embodiment, the n display pixels representing a single source image pixel are adjusted by following a color mapping scheme to provide additional color depth. For example, in the set of n display pixels, pixel #1 is driven with additional grayscale values, pixel #2 is driven with x % of the source image pixel grayscale values, pixel #3 is driven with y % of the source image pixel grayscale values, etc. When averaged and integrated by the user's visual system, the n pixels appear to provide additional color depth.

In another embodiment, the dynamic luminance range of the displayed image may be enhanced by only using one or more of the n display pixels associated with a single source image pixel when the source image pixel has a high luminance value (e.g., it is white). Selective increase of the dynamic range over one or more regions of the source image and/or particular grayscale range(s) can also be utilized.

Yet in another embodiment, with n display pixels associated with each source image pixel, the temporal response of the display device is manipulated by sequentially switching on/off at least one of the n display pixels to provide several spatially and temporally divergent displayed pulses of light per source image pixel.

These and other features, aspects and advantages of the present invention will become understood with reference to the following description, appended claims and accompanying figures.

DETAILED DESCRIPTION OF THE INVENTION

A method of selectively mapping each pixel from a source image into n display pixels for display on a display screen (i.e., 1:n mapping wherein n is a positive integer), may be based on the pixel resolution of the input image and the native resolution of the display device, wherein the mapping provides a display image pixel format that is essentially optimized for display on the display device.

When a source image pixel (from a source device) is represented on a display by several (e.g., n) display pixels, according to an embodiment of the present invention, the characteristics of the display pixels are selectively controlled to provide desired visual effects such as: multiple luminance levels, increased color depth, increased dynamic luminance range, manipulation of temporal characteristics of the display, etc. Example embodiments of mapping of a source image pixel into several display pixels while selectively controlling characteristics of the display pixels, according to the present invention, are described below.

Providing Multiple Luminance Levels

When representing (i.e., mapping) each image pixel (from source device) on an electronic display by a number n of display pixels, according to an embodiment of the present invention, some or all of the n display pixels representing a single image pixel may be switched together to provide multiple desired luminance levels. The multiple luminance levels can be selected manually (by user) or automatically e.g. by detection of ambient lighting conditions and/or the type of image being displayed.

Figure 1A:
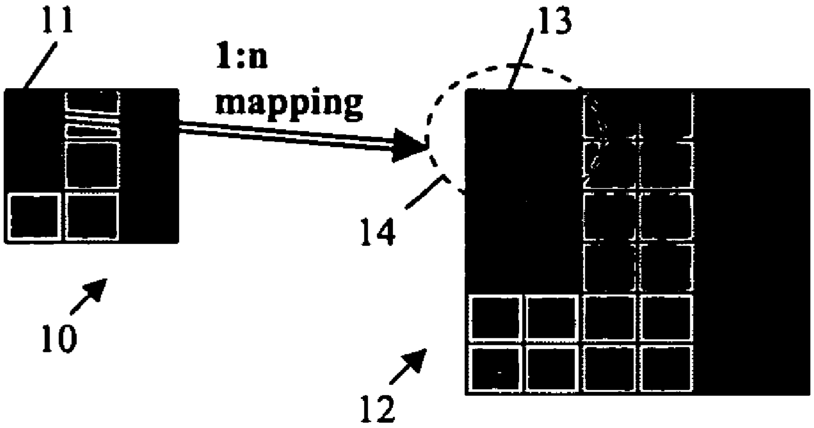
FIG. 1*a* shows an example basic mapping of a 3×3 set of source image pixels to a 6×6 set of display pixels, wherein each source image pixel is associated with n=4 display pixels, according to an embodiment of the present invention.
Figure 1B:
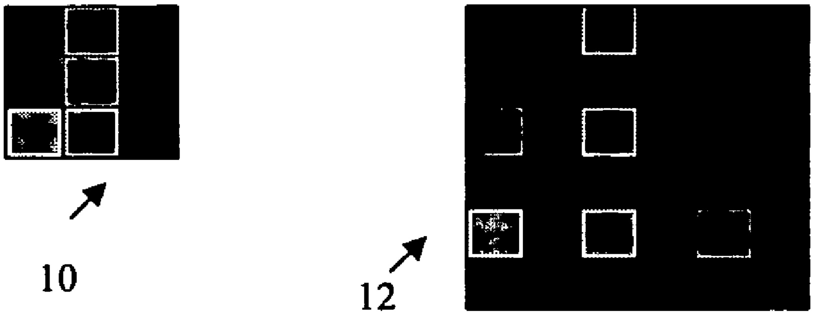
FIG. 1*b* shows another example mapping wherein the same source image pixels as in FIG. 1*a* are mapped such that only one of the n display pixels is 'on', according to an embodiment of the present invention.
Figure 1C:
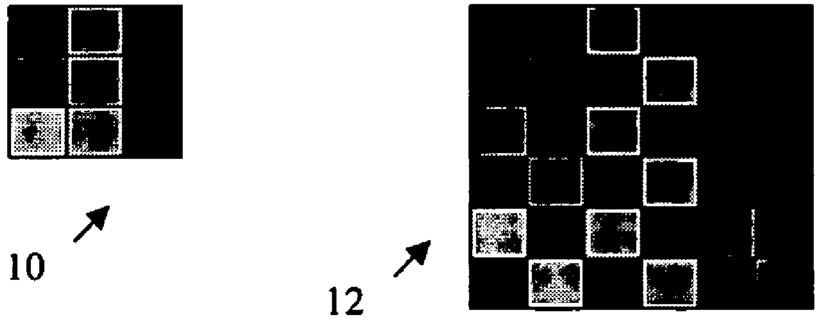
FIG. 1*c* shows another example mapping wherein the same source image pixels as in FIG. 1*a* are mapped such that two the n display pixels are 'on', according to an embodiment of the present invention.

Referring to FIGS. 1*a-c*, example implementations of this embodiment of the present invention are now described.

FIG. 1*a* shows a basic mapping of a 3×3 set 10 of source image pixels 11 to a 6×6 set 12 of display pixels 13 —i.e., each source image pixel 11 is associated with (i.e., mapped to) a set 14 of n=4 display pixels 13 in this example.

FIG. 1*b* shows the same source image pixels 10 as in FIG. 1*a*, but in this case only one of the n display pixels 13 associated with each image pixel 11 is 'on'.

FIG. 1*c* shows the same source image pixels 10 as in FIG. 1*a*, but in this case two of n display pixels 13 associated with each source image pixel 11 are 'on'

It is noted that: (1) FIG. 1*b* shows the lowest luminance level of a display that can represent the original source image pixels 12, (2) FIG. 1*c* shows the same representation with twice the lowest luminance, and (3) FIG. 1*a* shows the same representation with four times the lowest luminance level. At three-times the lowest luminance level case is also possible by turning 3 display pixels 13 per source image pixel 11 'on' (not shown).

The number of luminance levels possible in the example is equal to the number n of display pixels 13 associated with each image pixel 11 and is independent of display technology. Several schemes for selecting luminance levels are possible. One example involves user selection (preference) implemented with an appropriate control mechanism (e.g., mouse and control panel, remote control, etc.). Another example involves automatic selection by: (1) detection of ambient lighting conditions wherein control electronics or software seeks to maintain a constant contrast ratio of the displayed image, (2) detection of the type of source image type (e.g., movie, game, office application, etc.) and optimization of the luminance level for the source image type, etc. As those skilled in the art recognize, other examples of selecting luminance levels are possible.

Increasing Color Depth

In another embodiment, the n display pixels representing (i.e., mapped from) a single source image pixel may be adjusted by following a color mapping scheme to provide additional color depth. In one example, for a set of n display pixels, pixel #1 is driven with additional grayscale values, pixel #2 is driven with x % of the source image pixel grayscale values, pixel #3 is driven with y % of the source image pixel grayscale values, etc. When averaged and integrated by the user's visual system, the n display pixels appear to provide additional color depth.

Figure 2A:
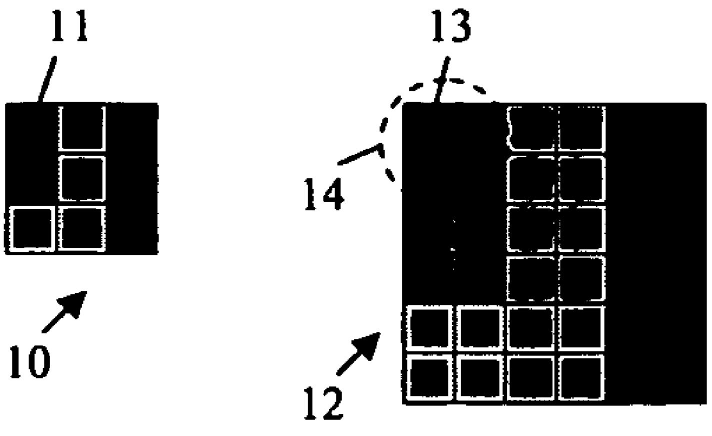
FIG. 2*a* shows an example basic mapping of a 3×3 set of source image pixels to a 6×6 set of display pixels, wherein each source image pixel is associated with n=4 display pixels, according to an embodiment of the present invention.
Figure 2B:
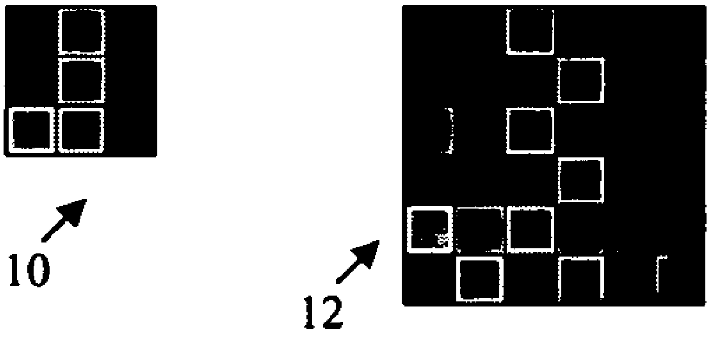
FIG. 2*b* shows another example mapping wherein the same source image pixels as in FIG. 2*a* are mapped such that the n display pixels associated with a source image pixel have the basic color of the source image pixel but a different luminance (grayscale) value, according to an embodiment of the present invention.
Figure 2C:
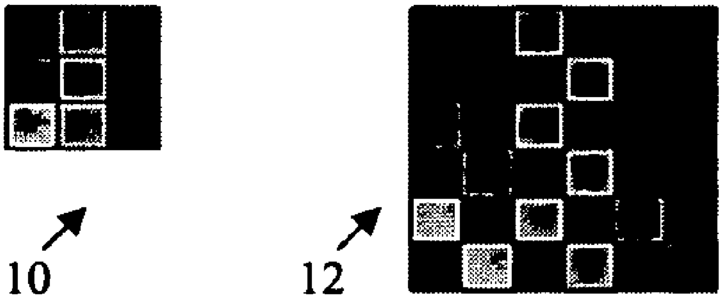
FIG. 2*c* shows another example mapping including a form of spatial dithering used to achieve the perception of increased color depth whereby the user will "see" a combined effect of the n display pixels, not the individual display pixels, provided that the display resolution and viewing distance are appropriate, according to an embodiment of the present invention.

Referring to FIGS. 2*a-c*, example implementations of this embodiment of the present invention are now described.

Similar to FIG. 1*a*, the example in FIG. 2*a* shows a basic mapping of a 3×3 set 10 of source image pixels 11 to a 6×6 set 12 of display pixels 13 —i.e., each source image pixel 11 is associated with (i.e., mapped to) a set 14 of n=4 display pixels 13 in this example.

FIG. 2*b* shows an example mapping where each of the n display pixels 13 associated with a source image pixel 11 have the basic color of the source image pixel 11 but a different luminance (grayscale) value.

FIG. 2*c* shows an example mapping including a form of spatial dithering used to achieve the perception of increased color depth whereby the user will "see" a combined effect of the n display pixels, not the individual display pixels, provided that the display resolution and viewing distance are appropriate, according to an embodiment of the present invention. In this example of spatial dithering according to the present invention, the information carried by adjacent source image pixels is preserved without loss. In conventional spatial dithering, however, the information content of adjacent image pixels is merged together wherein image information is traded for additional color depth.

Increasing Dynamic Luminance Range

In another embodiment, the dynamic luminance range of the display may be enhanced by only using one or more of the n display pixels associated with (i.e., mapped from) a single source image pixel when the source image pixel has a high luminance value (e.g. it is white).

Figure 3A:
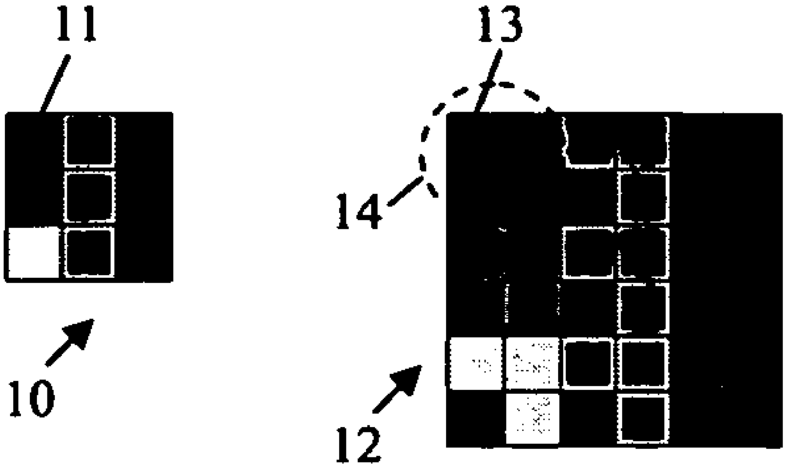
FIG. 3*a* shows an example basic mapping of a 3×3 set of source image pixels to a 6×6 set of display pixels, wherein each source image pixel is associated with n=4 display pixels, according to an embodiment of the present invention.
Figure 3B:
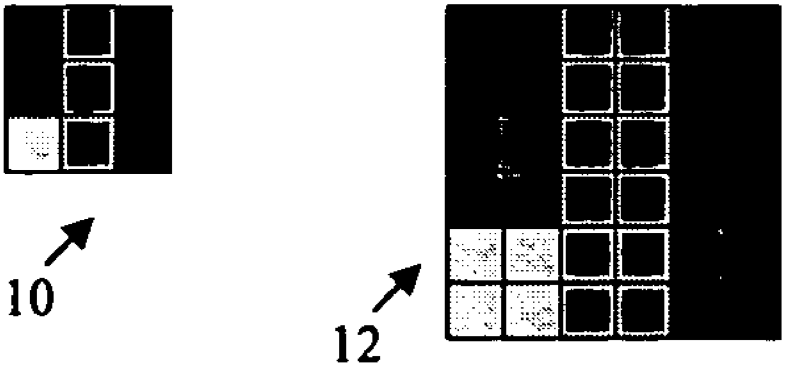
FIG. 3*b* shows another example mapping wherein the same source image pixels as in FIG. 3*a* are mapped such that the display pixels have a 33% increase for the dynamic range of the representation of each source image pixel by turning 'on' one more of the associated n display pixels, according to an embodiment of the present invention.

Referring to FIGS. 3*a-b*, example implementations of this embodiment of the present invention are now described.

Similar to FIG. 1*a*, the example in FIG. 3*a* shows a basic mapping of a 3×3 set 10 of source image pixels 11 to a 6×6 set 12 of display pixels 13—i.e., each source image pixel 11 is associated with (i.e., mapped to) a set 14 of n=4 display pixels 13. FIG. 3*a* depicts an example "normal" operation, wherein only a portion (e.g., three) of the n display pixels 13 associated with each source image pixel 11 have the same color and grayscale value as that source image pixel 11.

FIG. 3*b* shows a 33% increase for the dynamic range of the representation of each source image pixel 11 by turning on one more of the associated n display pixels 13 (e.g., turn on an additional display pixel 13 for one frame).

Referring back to FIG. 3*a*, in the "normal" operational mode of the display each source image pixel 11 is replicated on n display pixels 13, providing a certain luminance level. In one example, by continuously analyzing the source image pixels 10, region(s) of the source image where the perceived image quality can be enhanced may be detected. For such detected region(s), increasing the dynamic luminance range of the displayed pixels enhances perceived displayed image quality. In one case, this can be achieved by momentarily turning on one or more additional pixels of the n display pixels 13 associated with each source image pixel 11 for the selected region(s).

Although above examples of increased dynamic range show all the source image pixels 11 being treated equally, this is not required. Selective increase of the dynamic range over one or more regions of the source image and/or particular grayscale range(s) can also be utilized. Examples of changing one region only include picture-in-picture for TV, a software application program window (e.g., word processor) on a computer screen, etc.

Manipulating Temporal Characteristics of the Display Device

Yet in another embodiment, with n display pixels mapped from each source image pixel, the temporal response of the display device can be manipulated by sequentially switching on/off at least one of the n display pixels to provide several spatially and temporally divergent displayed pulses of light per source image pixel.

Referring to FIGS. 4*a-g*, example implementations of this embodiment of the present invention are now described.

Figures 4A, 4B, 4C, 4D, 4E, 4F, 4G:
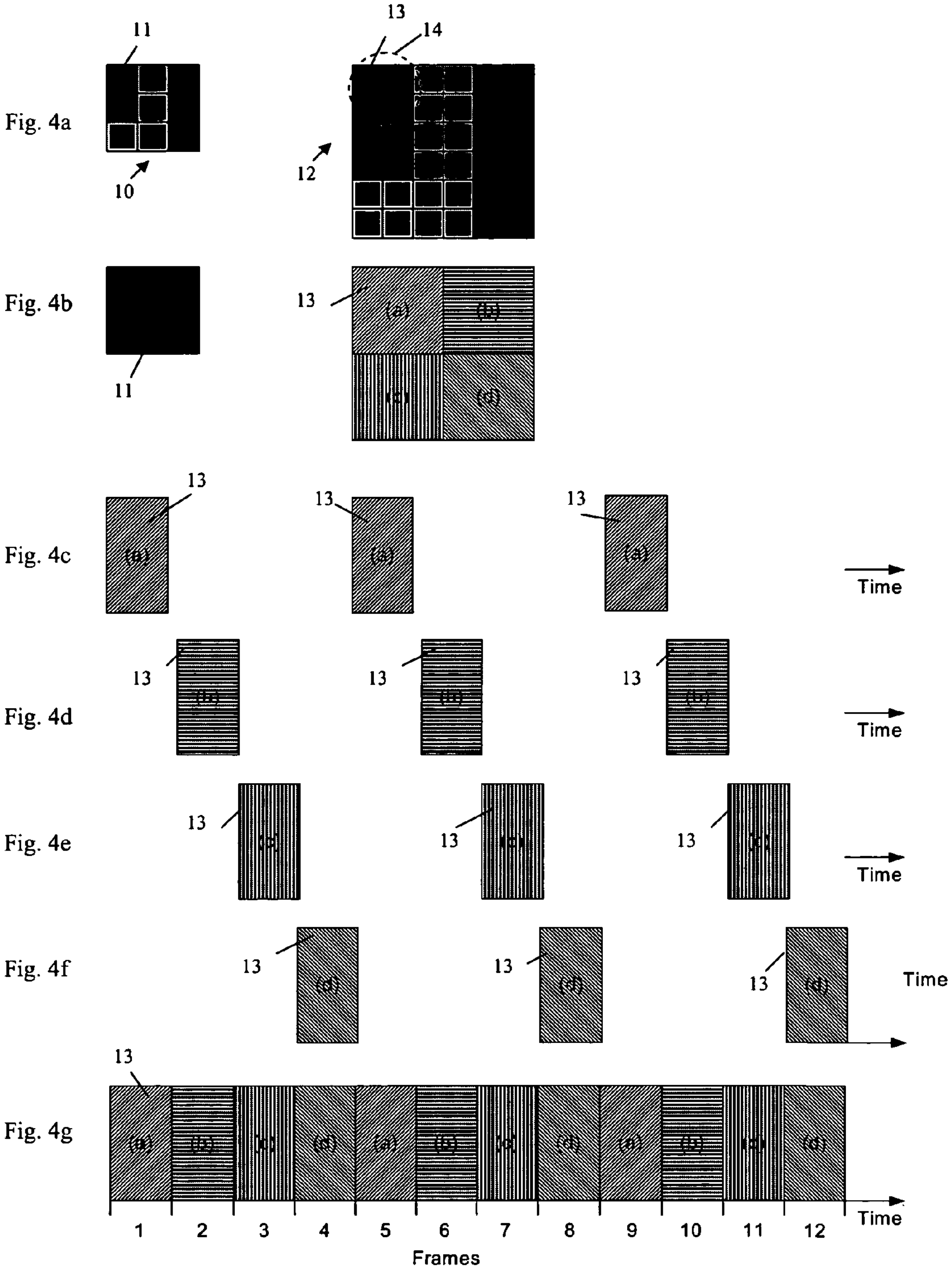
FIG. 4*a* shows an example basic mapping of a 3×3 set of source image pixels to a 6×6 set of display pixels, wherein each source image pixel is associated with n=4 display pixels, according to an embodiment of the present invention.
FIG. 4*b* shows details of a single source image pixel in FIG. 4*a* mapped to n=4 display pixels (a) through (d).
FIG. 4*c* shows example time segments when display pixel (a) of FIG. 4*b* is 'on', according to an embodiment of the present invention.
FIG. 4*d* shows example time segments when display pixel (b) of FIG. 4*b* is 'on', according to an embodiment of the present invention.
FIG. 4*e* shows example time segments when display pixel (c) of FIG. 4*b* is 'on', according to an embodiment of the present invention.
FIG. 4*f* shows example time segments when display pixel (d) of FIG. 4*b* is 'on', according to an embodiment of the present invention.
FIG. 4*g* shows the combined 'on' time of the display pixels (a)-(d) shown in FIGS. 4*c-f*, according to an embodiment of the present invention.

Similar to FIG. 1*a*, the example in FIG. 4*a* shows a basic mapping of a 3×3 set 10 of source image pixels 11 to a 6×6 set 12 of display pixels 13—i.e., each source image pixel 11 is associated with (i.e., mapped to) a set 14 of n=4 display pixels 13.

FIG. 4*b* shows details of mapping a single source image pixel 11 to n=4 display pixels 13, identified as display pixels (a) through (d), wherein in the drawing the patterns on the display pixels (a)-(d) are merely to aid in the illustration to distinguish between different display pixels.

FIG. 4*c* shows example time segments when display pixel (a) is 'on'.

FIG. 4*d* shows example time segments when display pixel (b) is 'on'.

FIG. 4*e* shows example time segments when display pixel (c) is 'on'.

FIG. 4*f* shows example time segments when display pixel (d) is 'on'.

FIG. 4*g* shows the combined 'on' time of the display pixels (a)-(d) associated with the single source image pixel 11, shown in frames 1 through 12 over time.

FIGS. 4*c-f* show one example of how the n display pixels associated with a source image pixel can be used to provide a constant average luminance (FIG. 4*g*), to avoid/minimize flicker while maintaining the characteristic that the average luminance is composed of a number of spatially distributed luminance pulses. Other examples are possible. Further, in another example, not all of the n display pixels are involved in the sequence. In addition, the sequence in FIGS. 4*c-f* can be changed in order and/or duration to optimize for the characteristics particular to a particular display device.

Figure 5:
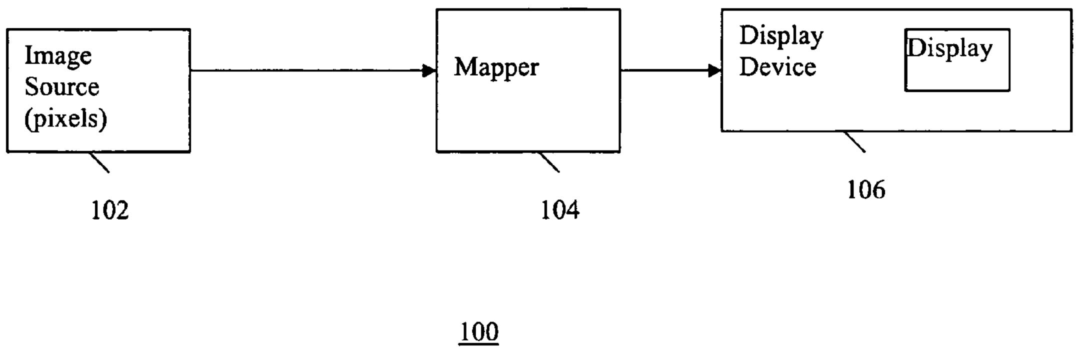
FIG. 5 shows an example block diagram of a display system including a mapper which implements an embodiment of the present invention.
Figure 6:
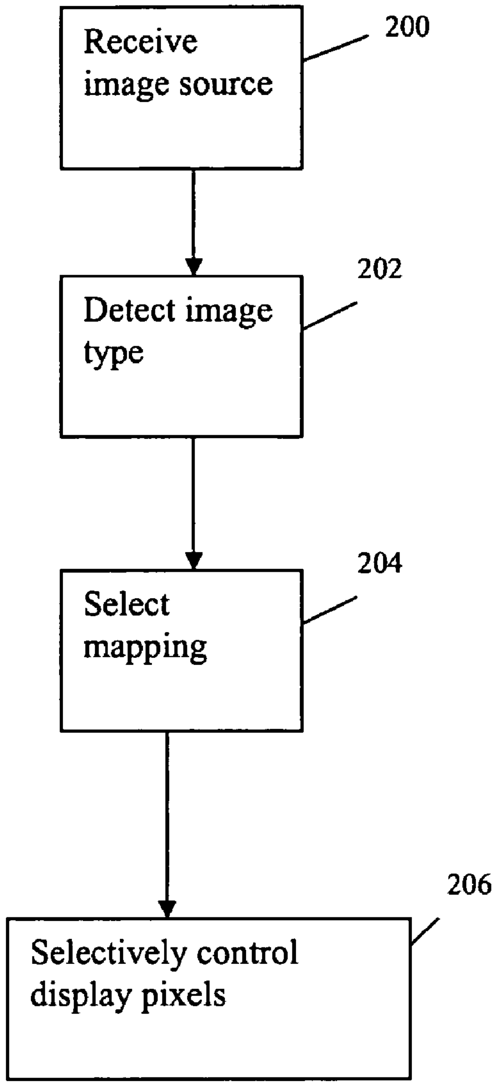
FIG. 6 shows a flowchart of an example operation of the mapper according to an embodiment of the present invention.

FIG. 5 shows an example block diagram of a system 100 including a image source 102, a mapper 104 that implements the above embodiments of the present invention, and a display device 106. The mapper 104 selectively maps each pixel from a source image into n pixels of a display screen (1:n mapping). Referring to the example flowchart in FIG. 6 the steps of operation of the example mapper 104 in mapping and selectively controlling display pixels n to provide desired visual effects, include:

Step 200: receiving an input image source.

Step 202: detecting the type (e.g., word processing document, video game, etc.) of input source (e.g., by analyzing the input signal (e.g., TV images move a lot, computer images are mostly static, etc.), or by analyzing the interface type (e.g., TV, VGA, etc.), etc.).

Step 204: selecting the mapping needed/desired.

Step 206: based on the mapping, selectively control display pixels to provide desired visual effects (e.g., provide one or more of: multiple luminance levels, increased color depth, increased dynamic luminance range, manipulation of temporal characteristics of the display, etc., described above).

As such, when a source image pixel (from a source device) is represented on a display by several (e.g., n) display pixels, the present invention provides selective control of the additional display pixels to provide desired visual effects such as additional color depth and dynamic range, improved perceived temporal response characteristics of the display, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of displaying a pixilated input image on a display device, comprising the steps of:

mapping the input image comprising source pixels into a display image comprising display pixels while selectively controlling the characteristics of the display pixels to provide desired visual effects, wherein each source pixel is mapped to n display pixels; and displaying the display image on the display device, wherein the mapping includes the steps of sequentially switching on/off at least one of the n display pixels to provide several spatially and temporally divergent displayed pulses of light per source pixel.

2. The method of claim 1 wherein the step of mapping includes the steps of replicating a source pixel into n display pixels.

3. The method of claim 1 further including the steps of selecting a mapping based on the pixel resolution of the input image and the native resolution of the display device.

4. The method of claim 1 further including the steps of selecting a mapping based on the type of the input image and the display characteristics of the display device.

5. The method of claim 1 further including the steps of selecting a mapping such that the n display pixels provide multiple luminance levels.

6. The method of claim 5 wherein the mapping further includes the steps of switching two or more of the n display pixels together to provide multiple desired luminance levels.

7. The method of claim 1 further including the steps of selecting a mapping such that the n display pixels provide increased color depth.

8. The method of claim 7 wherein the mapping further includes the steps of adjusting the color of the n display pixels using a color mapping scheme to increase color depth.

9. The method of claim 8 wherein the grayscale characteristics of one or more of the n display pixels is selected based on the grayscale characteristics of the corresponding source pixel.

10. The method of claim 9 wherein the grayscale characteristics of one or more of the n display pixels is selected based on the grayscale characteristics of the corresponding source pixel, and wherein the grayscale characteristics of one or more of the n display pixels is selected independent of the grayscale characteristics of the corresponding source pixel.

11. The method of claim 1 further including the steps of selecting a mapping such that the n display pixels provide increased dynamic luminance range.

12. The method of claim 11 wherein the mapping includes the steps of enhancing the dynamic luminance range of the display by only using one or more of the n display pixels when the source image pixel has a high luminance value.

13. The method of claim 1 further including the steps of selecting a mapping such that the n display pixels manipulate temporal characteristics of the display device.

14. A display system for displaying a pixilated input image from an input image source, comprising:

a mapper that maps the input image comprising source pixels into a display image comprising display pixels while selectively controlling the characteristics of the display pixels to provide desired visual effects, wherein each source pixel is mapped to n display pixels, and the mapper sequentially switches on/off at least one of the n display pixels to provide several spatially and temporally divergent displayed pulses of light per source pixel.

15. The system of claim 14 wherein the mapper replicates a source pixel into n display pixels.

16. The system of claim 14 wherein the mapper selects a mapping based on the pixel resolution of the input image and the native resolution of the display device.

17. The system of claim 14 wherein the mapper selects a mapping based on the type of the input image and the display characteristics of the display device.

18. The system of claim 14 wherein the mapper a mapping such that the n display pixels provide multiple luminance levels.

19. The system of claim 18 wherein the mapper switches two or more of the n display pixels together to provide multiple desired luminance levels.

20. The system of claim 14 wherein the mapper selects a mapping such that the n display pixels provide increased color depth.

21. The system of claim 20 wherein the mapper adjusts the color of the n display pixels using a color mapping scheme to increase color depth.

22. The system of claim 21 wherein the mapper selects the grayscale characteristics of one or more of the n display pixels based on the grayscale characteristics of the corresponding source pixel.

23. The system of claim 22 wherein the mapper selects the grayscale characteristics of one or more of the n display pixels based on the grayscale characteristics of the corresponding source pixel, and wherein the grayscale characteristics of one or more of the n display pixels is selected independent of the grayscale characteristics of the corresponding source pixel.

24. The system of claim 14 wherein the mapping is such that the n display pixels provide increased dynamic luminance range.

25. The system of claim 24 wherein the mapper enhances the dynamic luminance range of the display by only using one or more of the n display pixels when the source image pixel has a high luminance value.

26. The system of claim 14 wherein the mapping is such that the n display pixels manipulate temporal characteristics of the display device.

* * * * *